United States Patent
Wong et al.

(10) Patent No.: US 7,124,330 B2
(45) Date of Patent: Oct. 17, 2006

(54) PHYSICAL LAYER LOOP BACK METHOD AND APPARATUS

(75) Inventors: David Wong, Campbell, CA (US); Xi Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 803 days.

(21) Appl. No.: 10/292,581

(22) Filed: Nov. 13, 2002
(Under 37 CFR 1.47)

(65) Prior Publication Data
US 2004/0073849 A1  Apr. 15, 2004

Related U.S. Application Data

(60) Provisional application No. 60/413,767, filed on Sep. 27, 2002.

(51) Int. Cl.
*G06F 11/00* (2006.01)
(52) U.S. Cl. .......................... 714/43; 709/224
(58) Field of Classification Search .................. 714/43, 714/44, 45, 47, 48, 52, 56; 709/224, 225
See application file for complete search history.

(56) References Cited

U.S. PATENT DOCUMENTS

| | | | |
|---|---|---|---|
| 5,553,059 A * | 9/1996 | Emerson et al. ............ 370/248 |
| 6,480,748 B1 | 11/2002 | Gerszberg et al. |
| 6,628,621 B1 * | 9/2003 | Appleton et al. ........... 370/249 |
| 2002/0184363 A1 * | 12/2002 | Viavant et al. ............. 709/224 |
| 2003/0025960 A1 * | 2/2003 | Benvenuti et al. .......... 359/118 |
| 2003/0149921 A1 * | 8/2003 | Lau et al. ................... 714/704 |

* cited by examiner

*Primary Examiner*—Nadeem Iqbal
(74) *Attorney, Agent, or Firm*—Squire, Sanders & Dempsey, LLP

(57) ABSTRACT

The network device includes a transceiver, a pattern generation unit and a pattern recognition unit. The transceiver connects to a communications medium. The pattern generation unit connects to the transceiver. The pattern generation unit is configured to generate a first code word in response to a self-test signal. The pattern recognition unit connects to the communications medium and a network entity. The pattern recognition unit is configured to receive the first code word from the transceiver and to determine whether the first code word includes a loop back pattern. The pattern recognition unit is configured to generate a second code based upon the first code word and to include in the second code word a pattern different from the first code word.

18 Claims, 9 Drawing Sheets

PHYSICAL LAYER LOOP BACK METHOD AND APPARATUS

REFERENCE TO RELATED APPLICATIONS

This application claims priority from U.S. Provisional Patent Application Ser. No. 60/413,767, filed Sep. 27, 2002. The contents of the provisional application are hereby incorporated by reference.

BACKGROUND OF THE INVENTION

Field of the Invention

The invention generally relates to the field of network diagnostic testing. In particular, the present invention is directed to systems and methods for testing a transmission line in a network such as an Ethernet network.

Recent innovations in the communications industry have promoted the unprecedented growth of the Internet. As an example of this massive growth, numerous wide area networks connected to other network topologies were used to link networks nationally in order to connect networks internationally to form the World Wide Web. This massive growth of interconnecting networks has caused many network management issues. One such issue is that network managers for various service providers are now faced with the task of troubleshooting failures that occur within devices connected to their network, within components of the network devices, and within the network's transmission lines. Network managers are required not only to detect a failure, but are also required to determine where such failure is located and how to correct the failure. Many methods have been created to improve the maintenance of large data networks.

However, Ethernet, which is a popular protocol for local area networks (LAN), currently does not specify any sort of diagnostic test at the physical level, such as a loop back, because Ethernet was originally developed as a shared protocol. One current testing technique, which is associated with UNIX, the Internet, and TCP/IP (Transmission Control Protocol/Internet Protocol), is PING (Packet Internet Grouper). PING is a path loop test transmitted from one CPU back to another CPU. Ping merely tests an entire path, but cannot determine exactly where the failure exists or the location where a transmission line is broken. PING only indicates that a failure exists. Accordingly, in a switched Ethernet network, there is no current test for directly testing when a failure occurs on a transmission line. Therefore, a need exists for a network diagnostic test on the physical layer within switched Ethernet networks.

SUMMARY OF THE INVENTION

According to an embodiment of the present invention, provided is a network device. The network device includes a transceiver, a pattern generation unit and a pattern recognition unit. The transceiver connects to a communications medium. The pattern generation unit connects to the transceiver. The pattern generation unit is configured to generate a first code word in response to a self-test signal. The pattern recognition unit connects to the communications medium and a network entity. The pattern recognition unit is configured to receive the first code word from the transceiver and to determine whether the first code word includes a loop back pattern. The pattern recognition unit is configured to generate a second code based upon the first code word and to include in the second code word a pattern different from the first code word.

According to another embodiment of the present invention, provided is a method of performing a diagnostic test in a network. The method includes the steps of providing a transceiver, generating a first code word in response to a self-test signal, and receiving the first code word from the transceiver at a network device. The method also includes the steps of determining whether the first code word includes a loop back pattern at the network device, generating a second code based upon the first code word and including in the second code a pattern different from the first code word.

According to another embodiment of the present invention, provided is a network device. The network device includes a transceiver, a pattern generation means and a pattern recognition means. The pattern generation means connects to a connection medium. The pattern generation unit is for generating a first code word in response to a self-test signal. The pattern recognition means connects to the connection medium and a network entity. The pattern recognition means is for receiving the first code word from the transceiver and determining whether the first code word includes a loop back pattern. The pattern recognition means is configured to generate a second code based upon the first code word and include in the second code a pattern different from the first code word.

BRIEF DESCRIPTION OF THE DRAWINGS

The objects and features of the invention will be more readily understood with reference to the following description and attached drawings, wherein.

DETAILED DESCRIPTION OF THE PREFERRED EMBODIMENTS

The invention provides, in an example, an Ethernet PHY loop back self-test to diagnose failures or malfunctions that may occur within a network transmission line or a device connected to a network.

According to another embodiment, a network device may be an Ethernet switch, and accordingly, a packet may refer to an Ethernet frame as defined by IEEE 802.x and as modified herein. ATM (Asynchronous Transfer Mode) and other fixed cell length systems, as well as other devices and datagrams may also be within the scope of the invention.

Figure 1:
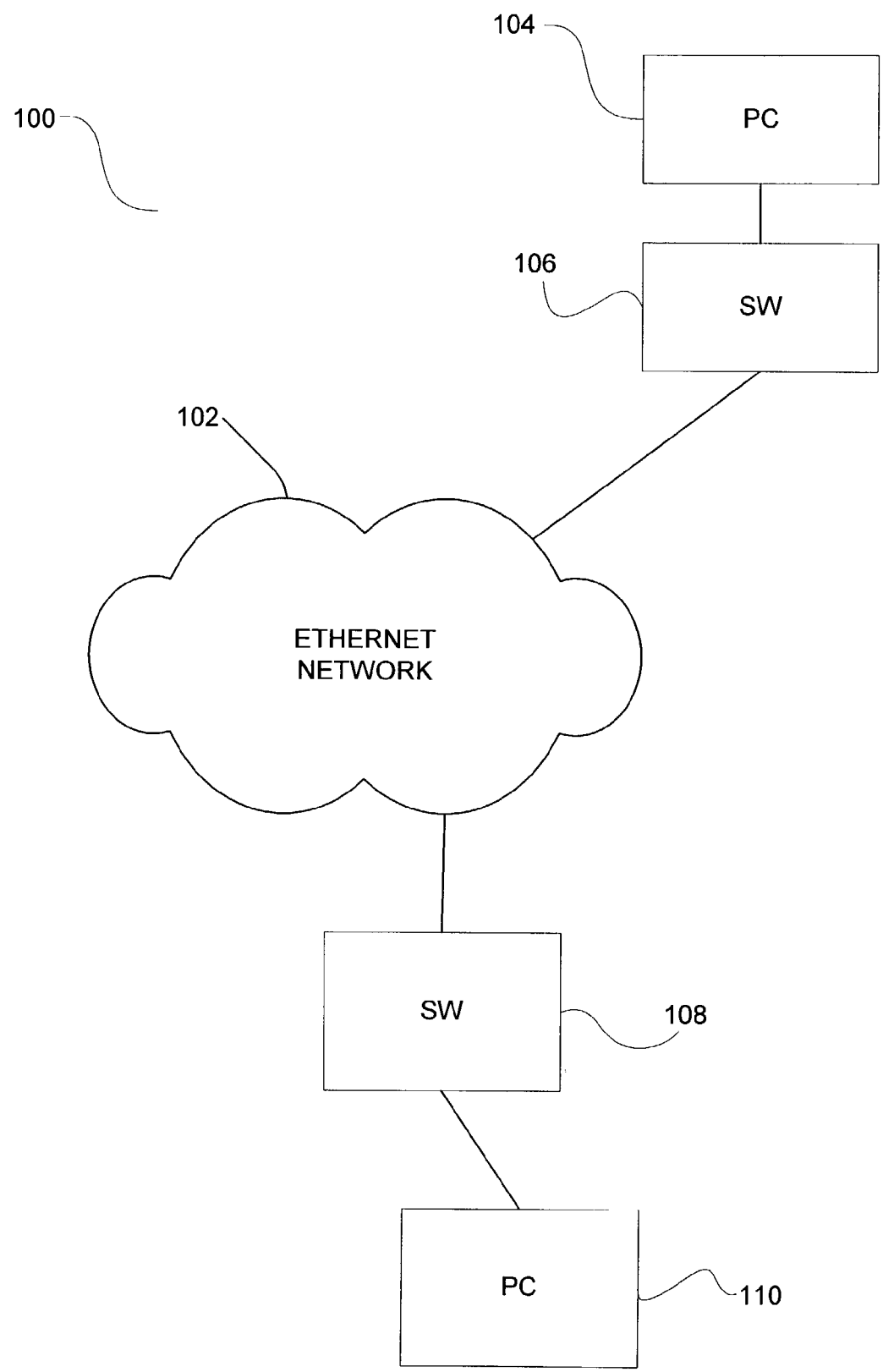
FIG. 1 is a block diagram of a network device according to an embodiment of the invention.

FIG. 1 is a block diagram of an exemplary network according to an embodiment of the invention. The network may include a switched Ethernet network 102, PCs 104 and 110 and switches 106 and 108. PC 104 connects to switch 106, which is connected to the Ethernet network 102. Although this example describes a network including switches 106 and 108, Ethernet network 102 may include any forwarding device such as a plurality of switches, hubs, routers, and other network devices for routing packets within the network. PC 110 connects to switch 108, which is also connected to Ethernet network 102. In a communication session between PC 104 and PC 110, packets will be routed from PC 104 to switch 106. The packets are routed to the Ethernet network 102 through a plurality of devices along a path, which may be predetermined or dynamically determined, to switch 108, and eventually to PC 110. However, under conventional techniques, when a packet destined from PC 104 to PC 110 fails to reach its destination, it is very difficult for the network manager to determine where the failure has occurred. For example, if PC 104 pings PC 110, the ping will return (loop back) to PC 104 only if the entire path is clear and every device, component, and line along that path is properly functioning. However, if a device, component or line does fail within Ethernet network 102, it becomes difficult to isolate the failed piece of equipment. In an Ethernet network, in order to determine whether a line connecting two devices is active and is functioning properly, the invention provides a loop-back function at the physical layer. To transmit packets from PC 104 to PC 110, the devices may operate according to the OSI seven-layer model.

Figure 2:
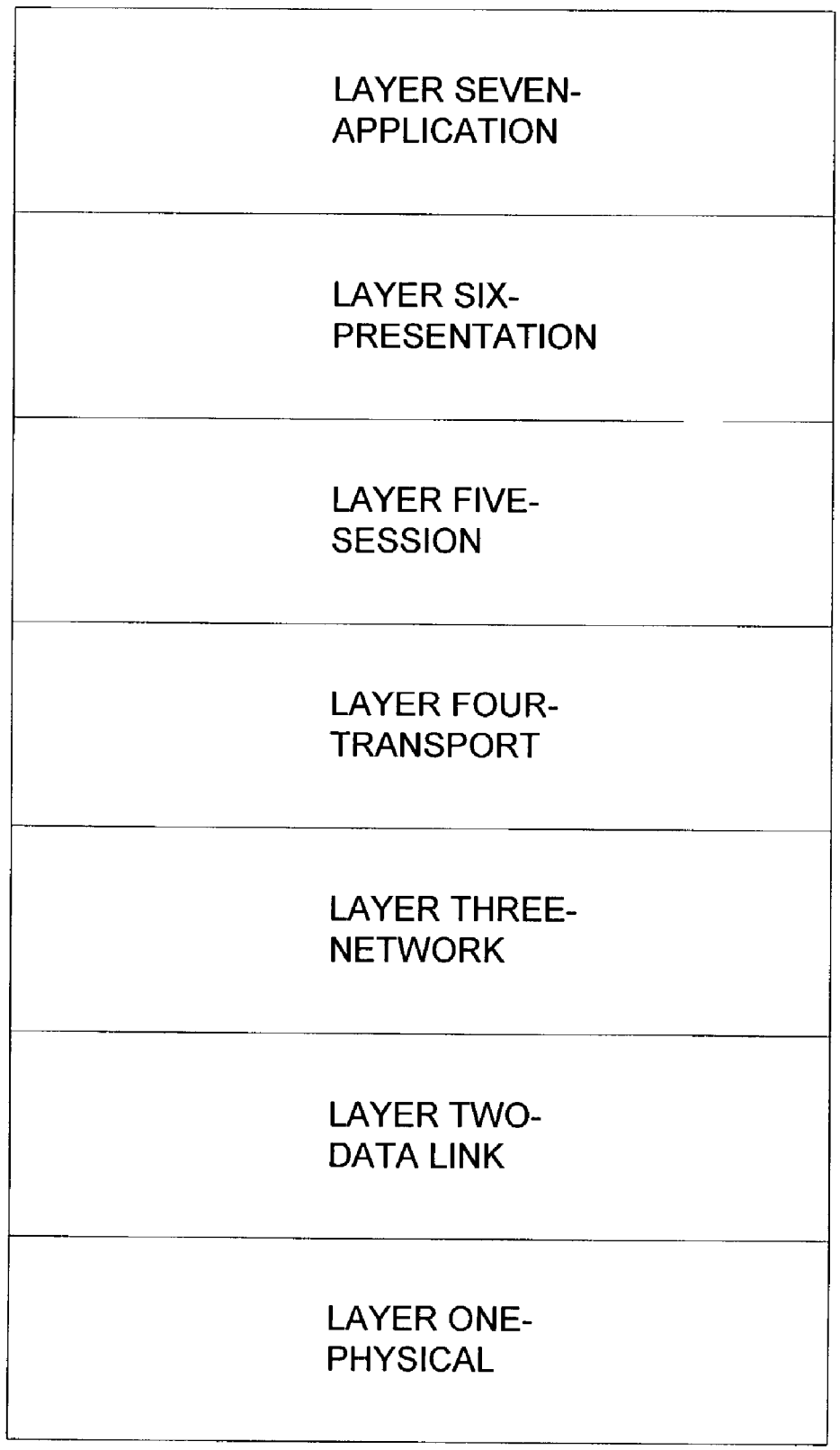
FIG. 2 describes the Open System Interconnection (OSI) model.

As shown in FIG. 2, the OSI model defines a stacked-layer communication protocol that allows network devices to operate with each other. The protocols defined in each layer are responsible for communicating with the same protocol layer running on an opposite network device. Each layer provides services to the layer positioned immediately above, except for the top-level application layer. In other words, although there are) several distinct layers, these layers do blend together. An OSI model layer typically communicates with three other layers: the layer below it, the layer above it, and its peer layer on the other network device. Thus, all communications move through the layers to reach the peer layer on the receiving network device.

To better understand how the network operates and interacts with devices connected to the network to perform a diagnostic test, first, the OSI 7-layer model is described briefly in further detail. FIG. 2 shows the OSI 7-layer reference model from IEEE 802.3x. Physical layer one is primarily hardware implemented and is concerned with the transmission of raw bits over communications channels and ensuring that "1's" and "0's" are received correctly. Layer two, the data link layer, is concerned with ensuring error-free transmission by dividing data into packets or frames and acknowledging receipt of the packets or frames. Layer two generally includes the MAC sublayer and the logical link control (LLC) sublayer. Layer two may be implemented by a combination of hardware and software. Layers three through seven are primarily software implemented and are concerned with specific network functions, such as routing information and packet congestion control, managing connections between senders and receivers, managing user sessions, data compression, transformation, syntax and presentation, and user interface to the network.

Specifically, the network layer handles multiple point-to-point links in the case where frames or packets are transmitted across multiple links to reach their destination. In broadcast networks such as Ethernet, a MAC (Media Access Controller) sublayer is typically added to allow multiple devices to share and contend for the use of the same medium.

While the data link layer is used to control communication between two devices that are directly connected together, the network layer provides Internet services. These services ensure that a packet reaches its destination when traveling across multiple point-to-point links, i.e., a set of interconnected networks joined by routers. The network layer basically manages multiple data link connections. On a shared LAN (local area network), packets addressed to devices on the same LAN are sent using data link protocols, but if a packet is addressed to a device on another LAN, network protocols such as TCP/IP (Transmission Control Protocol/Internet Protocol) are used.

The transport layer provides a high level of control for moving information between the end systems in a communication session. The destination network device may be on the same network or on a different network. Transport layer protocols set up a connection between a source and destination network device and send data in a stream of packets, meaning that each packet is numbered sequentially and constitutes a flow that can be monitored to ensure proper delivery and identity in the flow. The protocol also regulates the flow of packets to accommodate slow receivers and ensures that the transmission is not completely halted if a disruption in the link occurs.

The session layer coordinates the exchange of information between network devices by using conversational techniques, or dialogs. Dialogs can indicate where to restart the transmission of data if a connection is temporarily lost, or where to end one data set and start a new one.

Protocols at the presentation layer are for presenting data. Information is formatted for display or printing in this layer. Codes within the data, such as tabs or special graphics sequences, are interpreted. Data encryption and the translation of other character sets are also handled in this layer.

Applications access the underlying network services using defined procedures in this layer. The application layer is used to define a range of applications that handle file transfers, terminal sessions, and message exchange (for example, electronic mail).

Figure 3:
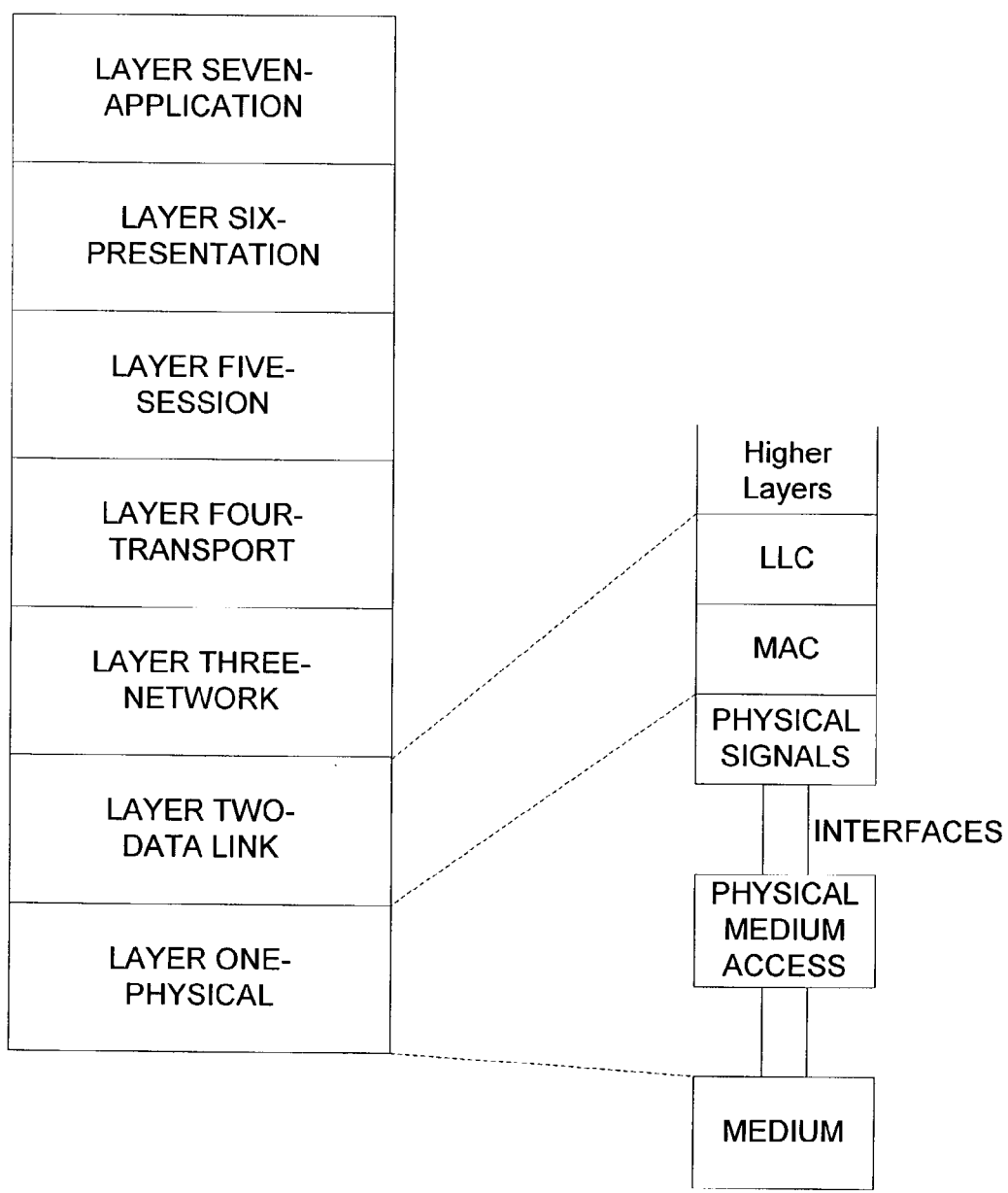
FIG. 3 illustrates a block diagram illustrating a relationship between the OSI model and the IEEE reference model.

FIG. 3 shows a block diagram illustrating a relationship of OSI and IEEE reference models. Shown here, the transmission medium, such as copper wire, optical fiber, coaxial cable, is attached to the physical medium attachment (PMA). An interface exists between a physical signaling part of the physical layer and the PMA. The physical signaling subsystem supports the signaling screen between the MAC layer and the PMA. Note that although considered part of the physical layer, the physical signaling (PLS) subsystem function is normally implemented locally to the MAC function. The MAC sublayer and the physical layer may primarily be supported directly in silicon, with implementations which are specific to particular design criteria. The LLC sublayer, which, with the MAC, forms the data link layer (DLL), is normally implemented in software, as are the higher layers (layer three through seven). The PMA is typically implemented by hardware and is often referred to as a transceiver, an MAU (medium attachment unit), or a PHY device.

Figure 4:
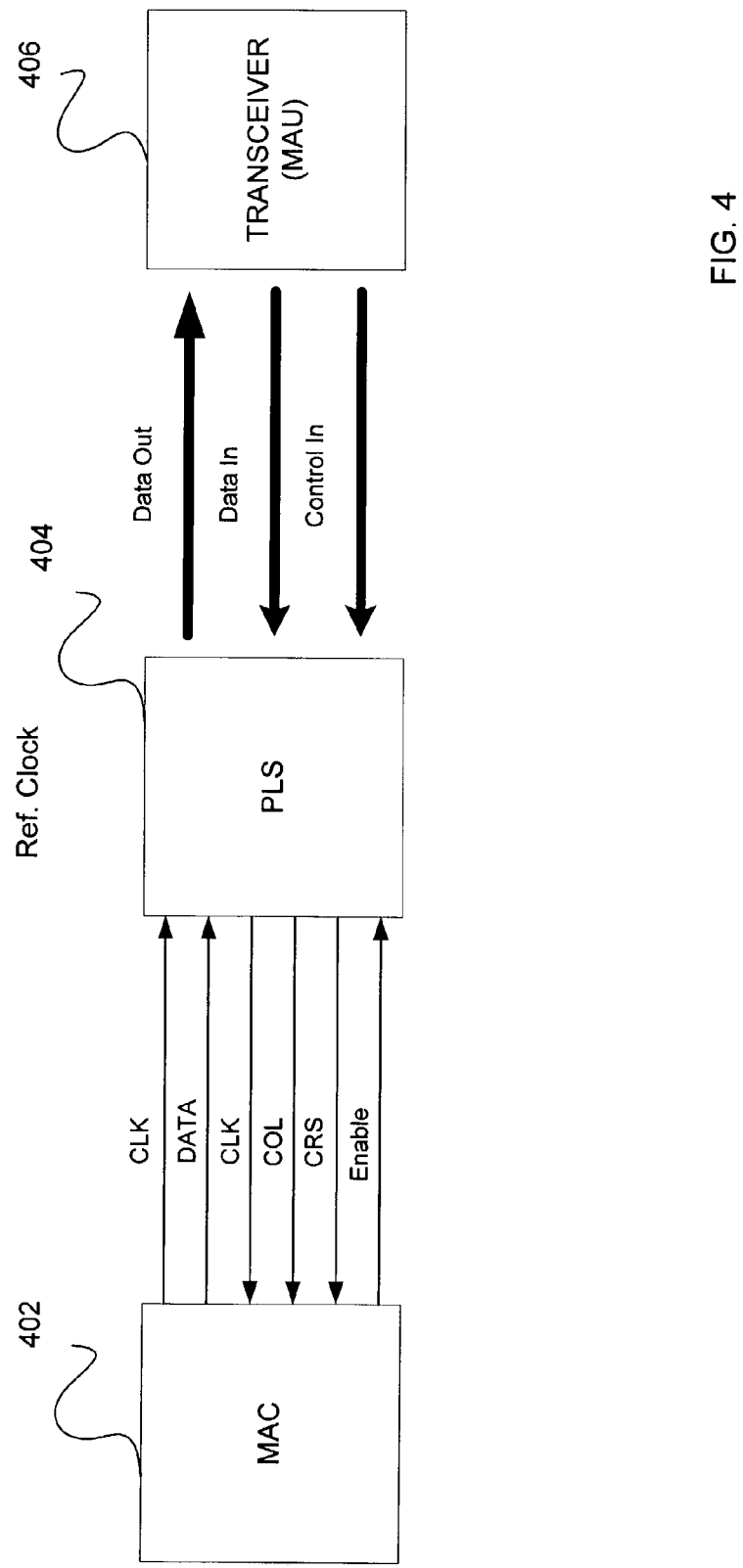
FIG. 4 shows an exemplary block diagram of an interface between a MAC (Media Access Controller) and a transceiver according to the invention.

Ethernet network 102 may use an interface between MAC 402 and transceiver 406 to determine whether either network device 104 or 110 is operating properly. FIG. 4 shows an exemplary block diagram of a MAC interface with a transceiver. In particular, the PLS 404 accesses the interface between the MAC 402 and the transceiver 406. The PLS 404 receives and transmits data from the transceiver 406 and also receives control signals from the transceiver 406. The PLS 404 may receive a reference clock. The PLS 404 sends and receives data, clock and other signals to and from the MAC 402. The data sent between the PLS 404 and the MAC 402 may be in a format, such as a serial data format, compatible with the MAC 402 and the higher layers. Accordingly, the PLS 404 encodes and decodes data in order to interface the physical medium to the MAC 402. The MAC 402 is also configured to determine whether or not the transceiver 406 is operational, such as by sending and receiving a test signal via the PLS 404.

The MAU (transceiver 406) provides the functional, electrical, and mechanical interface between the internal layers of the network device and the particular network medium in use. The transceiver 406 may include six primary functions to perform: transmit data, receive data, loop back, collision detection, signal quality error (SQE) test, and jabber protection. The transceiver 406 may be responsible for receiving data on a Data Out line and forwarding this data over the network. The transceiver 406 may provide the necessary drive capability to transmit the data over the network without modifying the content of the data in any way. Similarly, the transceiver 406 may ensure that data received from the network is passed to the inner layers (MAC 402) of the network device. The transceiver 406 may perform signal-amplitude and pulse-width detection on the received signal to ensure the signal's quality before forwarding the unmodified data. The loop back function may include a MAC-to-MAC path loop back function. The transceiver 406 may be responsible for detecting collisions on the network. If a collision exists, transceiver 406 may report back to the network device, such as via signal. The SQE test may be a self-test to ensure that its collision detection is working. A jabber mechanism may be provided to prevent a single node that continues to transmit for excessively long periods of time from completely utilizing the entire network.

Figure 5:
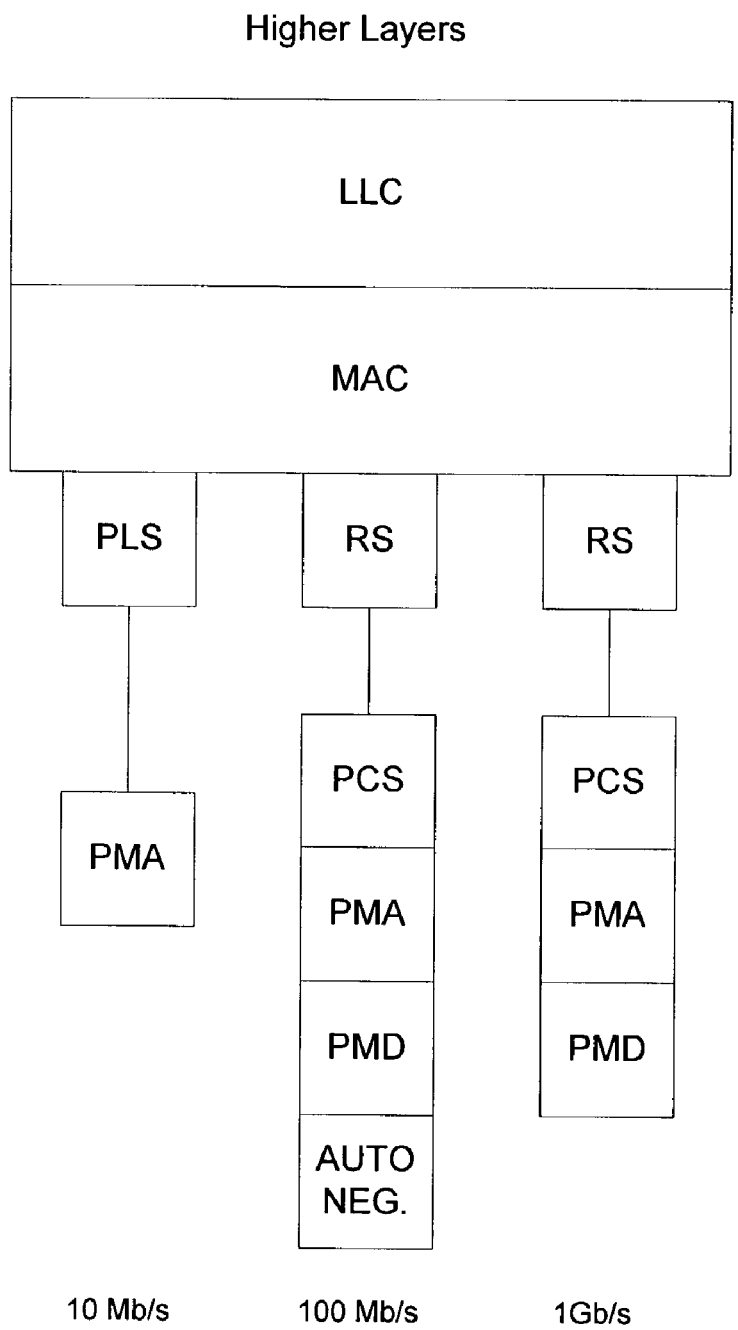
FIG. 5 depicts sublayers of the MAC according to the IEEE reference model.

As shown in FIG. 5, the network device may include higher layers, logical link control (LLC) sublayer, the media access control (MAC) sublayer and physical layer technology for Ethernet communications at 10megabits per second, 100 megabits per second and 1 gigabit per second. The physical layer may include a reconciliation sublayer RS, which may be considered part of the MAC or MII (Media Independent Interface) or GMII (Gigabit Media Independent Interface), a physical coding sublayer (PCS), a physical media attachment sublayer (PMA), and a physical media dependent sublayer (PMD). The PCS may provide the functions of data coding and decoding, which are usually independent of the physical medium used. However, in gigabit Ethernet, the coding scheme used for fiber media and short-shielded cables may be different from that of UTP (unshielded twisted-pair) copper media. The PMA sublayer may perform symbol serialization and deserialization. This converts the data from the media format to the MAC format. The PMD layer may perform the function of converting signals from a PMA layer into signals appropriate for the specific media. For example, if the medium is fiber, the electrical signals may be converted to optical signals and vice versa. The PHY may also include an autonegotiation function for 100 BASE-T or 1000 BASE-T. The autonegotiation sublayer may be considered a separate sublayer in the PHY or may be defined as a function block within the PCS.

Figure 6:
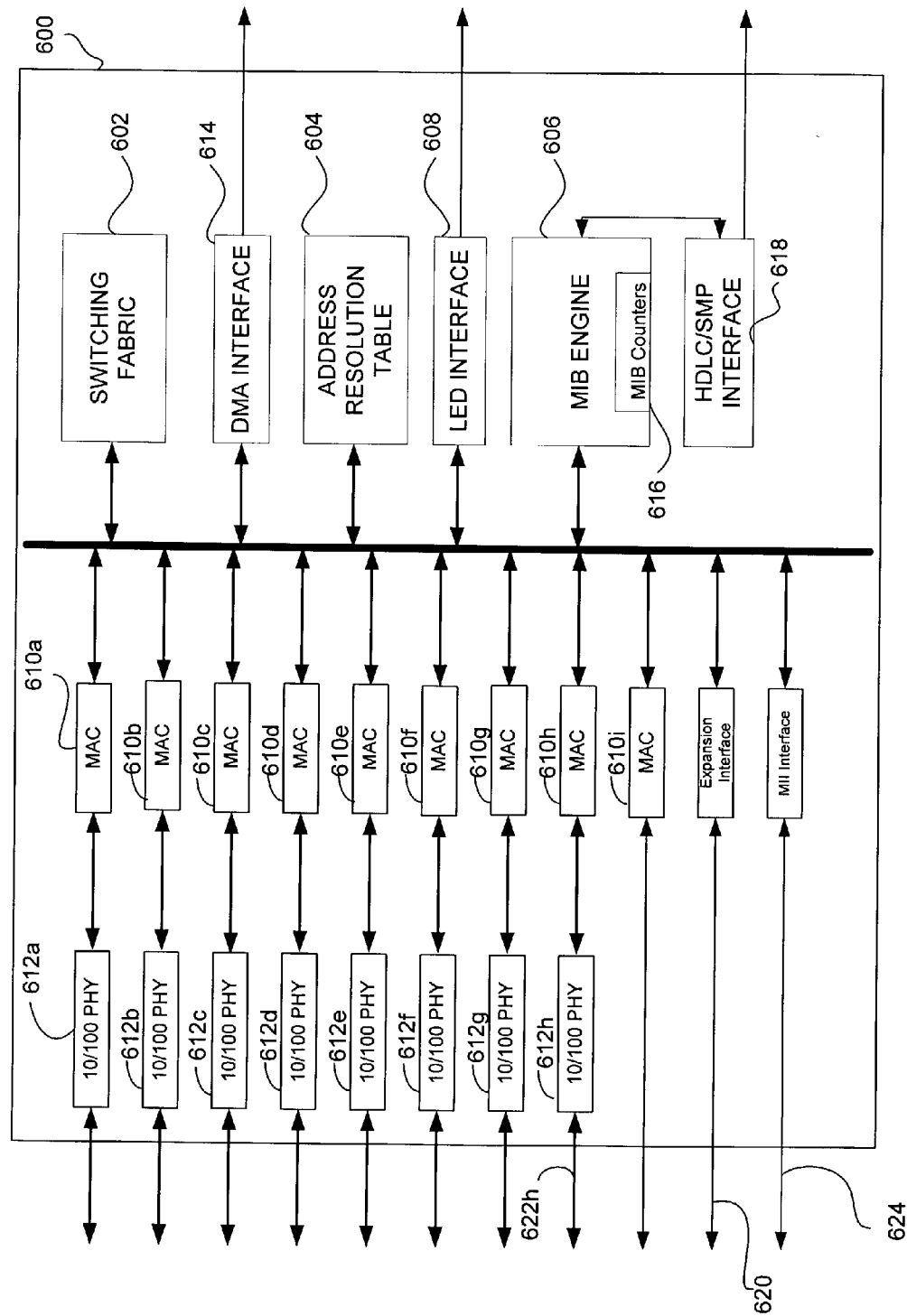
FIG. 6 illustrates a block diagram of a switch according to an embodiment of the invention.

FIG. 6 shows a simple block diagram of an exemplary packet forwarding device, which is shown as a switch according to this embodiment of the invention. Switch 600 may include subsystems which perform the key functions of a network switch, including a switching fabric subsystem 602, DMA interface 614, address resolution logic (ARL) 604, an LED or display interface 608, Management Information Base (MIB) engine 606, and HDLC/SMP interface 618. These functions represent the upper layers of the Ethernet switch. Switch 600 may also include a series of PHY devices 612*a* through 612*h*, which may interface with a series of corresponding MAC devices 610*a* to 610*h*. The PHY devices 610*a* through 610*h* may represent layer one devices, while the MAC devices 622*a* through 622*h* may be representative of layer two devices. Each PHY may include sublayers or function blocks as described above with reference to FIGS. 2–5.

To implement a PHY loop back self test in order to test a connection directly between two PHYs, each PHY may be configured to generate and transmit a unique pattern. This pattern can be generated in response to a control signal from the MAC or directly from the CPU. Because a PHY may communicate via a frame-based protocol, the pattern may be a set code that will not be recognized as a frame. In other words, the PHY may function to recognize a frame and transmit that frame to the MAC for switching or other network processing. Therefore, the pattern generated may be a pattern that would not be recognized as a frame by the receiving PHY. The pattern may be such that it will not be confused with an SFD (start frame delimiter) field or with a packet. The logic to generate the pattern may be built into the receiving PHY via a circuit, or may be incorporated into the PHY logical sublayers. The receiving PHY may also include a pattern recognition subsystem, which may be additional logic built into the PHY sublayers, or an additional circuit. The pattern recognition subsystem may be configured to recognize the unique pattern generated by the transmitting PHY and to handle the unique pattern as a request for a loop back, rather than as a frame. Accordingly, when data is received from a physical media at the receiving PHY, the pattern recognition subsystem will recognize whether or not the data is a frame, packet, or a loop back pattern. If a frame is received at the PHY, then the frame may be handled according to standard Ethernet protocol or layer one protocol. However, if a loop back pattern is received at the PHY, then the pattern recognition subsystem automatically recognizes that pattern as a request for a loop back, and the receiving PHY may generate another unique pattern as a return response and then send the pattern of the return response to the transmitting PHY. The return response pattern may be generated via any number of means, such as by detecting the incoming pattern via register or FIFO (first-in first-out), calculating a return response that is unique to the incoming pattern and driving the return response back onto the medium. Accordingly, the pattern recognition subsystem may be connected to the appropriate sublayer for generating, calculating, and driving the response pattern back onto the medium, or the PHY may include the appropriate circuitry in order to perform this function.

Figure 7A:
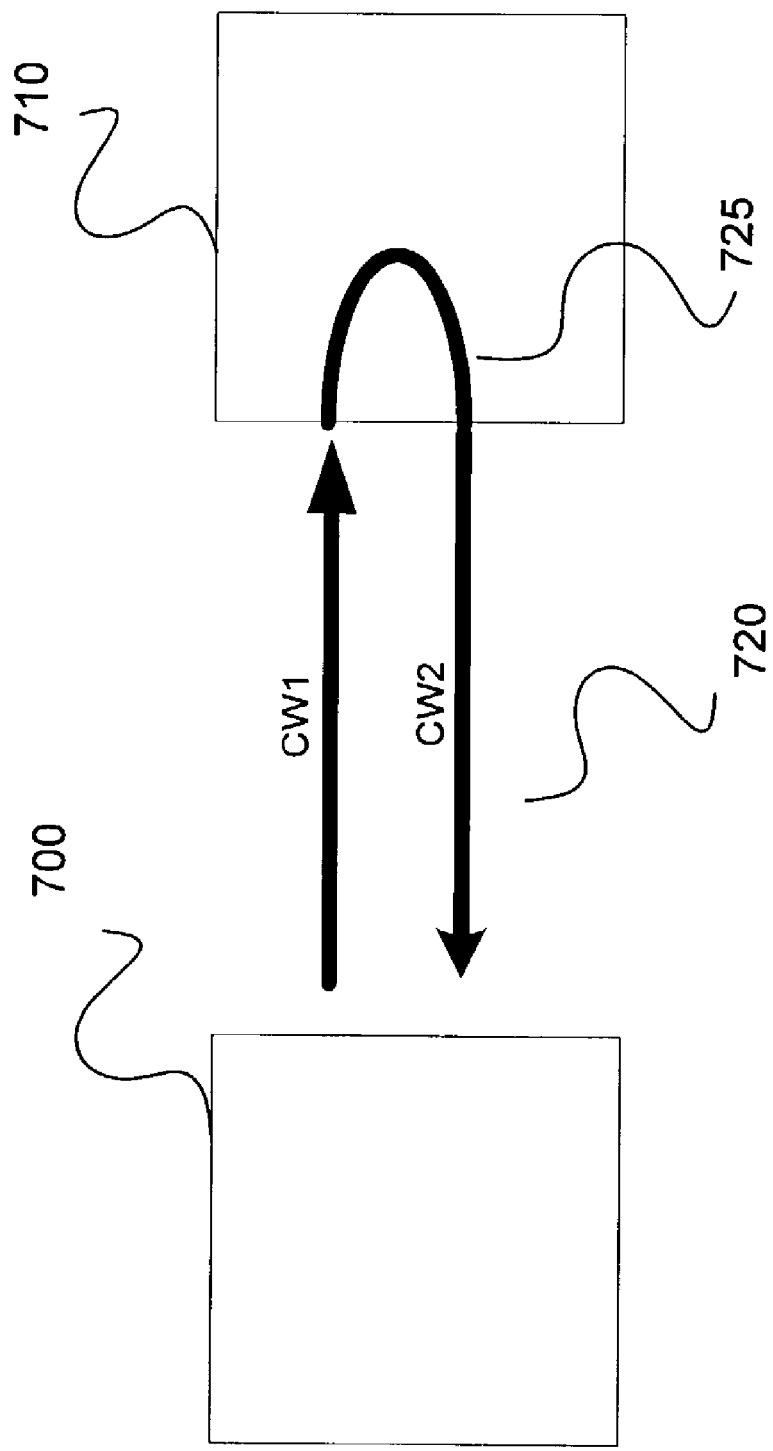
FIG. 7A shows an exemplary loop back according to an embodiment of the invention.

The loop back pattern may be sent out from a PHY or other network device to certify that a cable installation on the network is working properly or that another device on the network is working properly and is properly connected to the network. For instance, the loop back pattern may be sent out to troubleshoot a network device failure, a component failure or a line failure and determine where such a failure is located and how to correct the failure. To perform a diagnostic test in an Ethernet network as shown in FIG. 7A, network device 700 may generate a loop back pattern by transmitting a code word (CW1) which is transmitted to network device 710 via a transmission medium 720. The code word (CW1) of the loop back pattern may be configured so that network device 710 recognizes that the code word is a testing logic, instead of a regular data packet. For example, the code word may resemble bits, which are arranged as "010101." Therefore, instead of further processing or transmitting code word (CW1) to another device on the network, network device 710 may respond to code word (CW1) by creating a loop 725 and returning a response, code word (CW2), to indicate that network device 710 is operating properly and to indicate the operating parameters and conditions of network device 710. Instead of returning the original code word (CW1), network device may create a unique pattern for code word (CW2). Code word (CW2) may be, for example, "0111" so that code word (CW2) will not be confused with the original code word (CW1). The reason for the unique pattern of code word (CW2) is so that the network is able to detect and prevent looping from occurring within the network. Looping is a situation where a code word, pattern, packet or frame travels or circles endlessly within a looping-fashion on a network. If the code word is retransmitted back to network device 700 from network device 710, when network device 700 receives the original code word, network device 700 may retransmit the original code word back unto the network causing the code word to loop within the network. Thus, the invention may generate a unique pattern for the return response to indicate that the original code word has been received by the intended network device. Thus, the network device 710 may change or modify the original code word. Namely, not only does network device 710 change the original code word, it may generate a response pattern that is unique to the original code word. If the original code word (CW1) is "010101", code word (CW2) may be arranged as "0111", instead of "101010", which could easily be interpreted as the original code word. Thus, the invention may create a return response (CW2) that is unique from the original code word (CW1).

Looping may also occur when the intended network device fails to respond to the loop back pattern due to an error within the network device. In conducting a diagnostic test of the network device, as the code word is transmitted from network device 700 and travels along the network, each network device inspects the loop back pattern to determine if the code word is intended for that particular network device. If so, the intended network device will remove the code word from the network and send a return response. However, if the loop back pattern is not removed by a network device, the loop back pattern may continue to endlessly loop or circle the network.

Another feature of the invention that mitigates the occurrence of looping is that the switch may include a timer built in the code word. The timer may be transmitted with the pattern so that if the code word is not removed by a network device within a predetermined time, once the time period of the timer expires, a network device may drop or discard the loop back pattern. According to another embodiment, the invention may include a disable transmission to combat looping. A disable transmission may be transmitted by switch 100 to disable the loop back pattern if the return response is not received from the intended network device within a predetermined time.

Figure 7B:
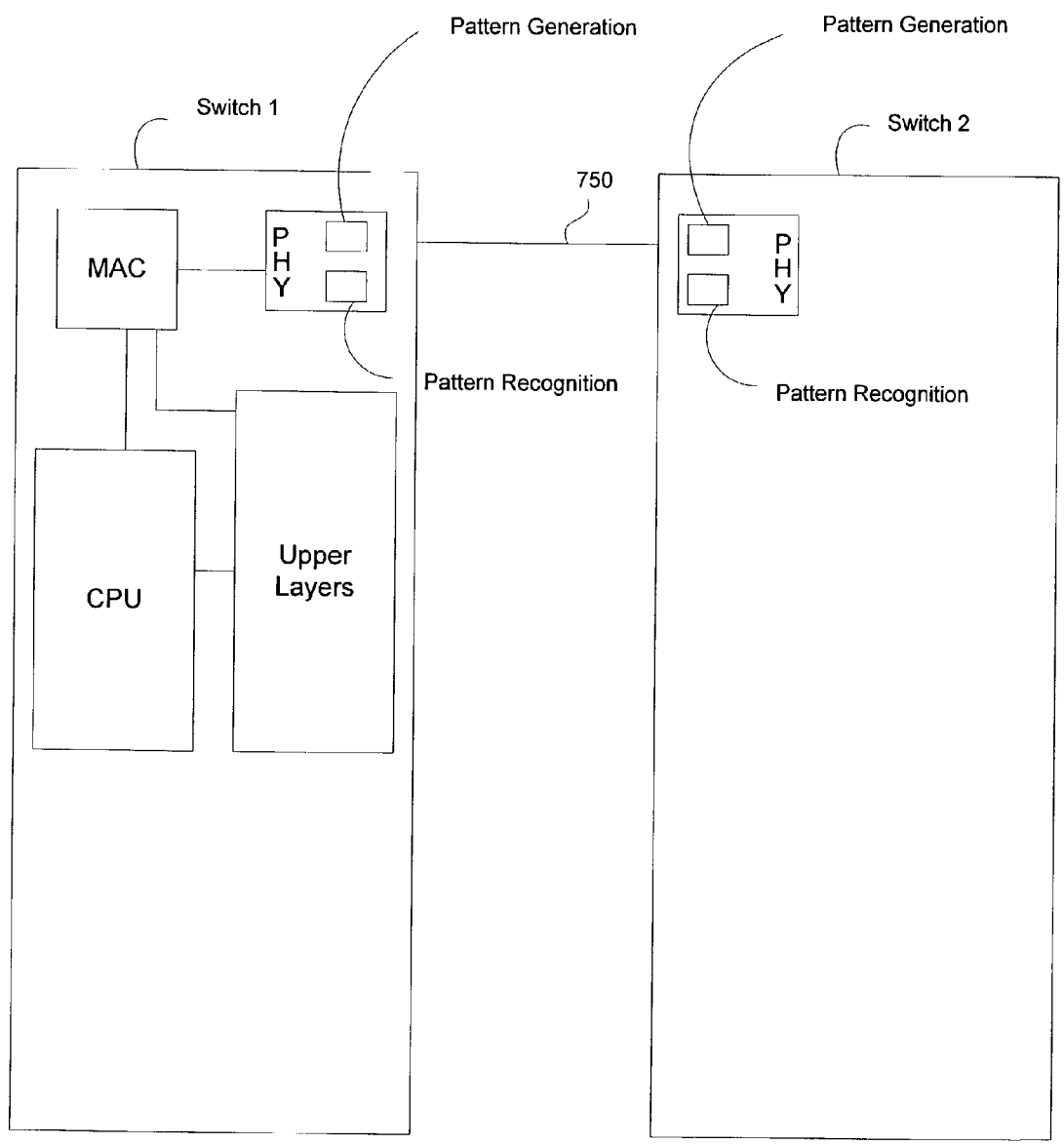
FIG. 7B depicts a diagram of two network switches connected via a physical medium according to an embodiment of the invention.

FIG. 7B shows a block diagram of two network switches connected via physical medium, such as a 10 BASE-T line, which uses two pairs of wires: one pair for transmission and the second pair for reception. Switch 1 may include certain switch functionality which is shown here as the upper layers, the MAC, and the PHY. Switch 1 may also include a CPU which is connected to the MAC and upper layers for assisting with certain processing functions. The PHY may include a pattern generation subsystem and a pattern recognition subsystem, which may be in addition to the PHY sublayers or may be embodied within the PHY sublayers. Accordingly, as part of a self test, or as directed, switch 1 may initiate a PHY loop back, generate a pattern as described above, and send the pattern to switch 2 via the line 750. Upon receiving the pattern, the PHY of switch 2, which may also include a pattern generation means and a pattern recognition subsystem, may recognize the pattern as the loop back pattern and return a unique return response back to line 750 to the PHY switch 1. When the PHY switch 1 receives the return response pattern, it may recognize that the test has been successful, and communication should be established between Switch 1 and Switch 2. The test may be initiated by the user via an interface or through the CPU. The CPU may communicate with the MAC which sends a control signal to the PHY to initiate the loop back test. While the PHY is in loop-back mode, recognition of the pattern may fulfill the test and register a successful signal back to the MAC. Success of the test may be communicated through an interface on the switch or to the user via the CPU, via a back office connection or over the network. If the PHY of switch 1 does not receive a return pattern, then the switch may be configured to time out after a predetermined amount of time has passed. For example, the MAC may terminate the test by sending a termination signal to the PHY after a period of two seconds has passed. In a situation where a timeout has occurred, they system may determine that the line has failed or that the PHY and switch 2 has failed. This failed result of the test can be reported to the user via a back office connection or via the network from the CPU switch 1.

It is important to note that the PHY loop back pattern, which is generated by the PHY, should be a pattern that would not be easily confused with an SFD or with a packet. Furthermore, the PHY loop back pattern should not be a pattern which may be easily misrecognized as a packet or an SFD if any noise is present in the system.

Figure 8:
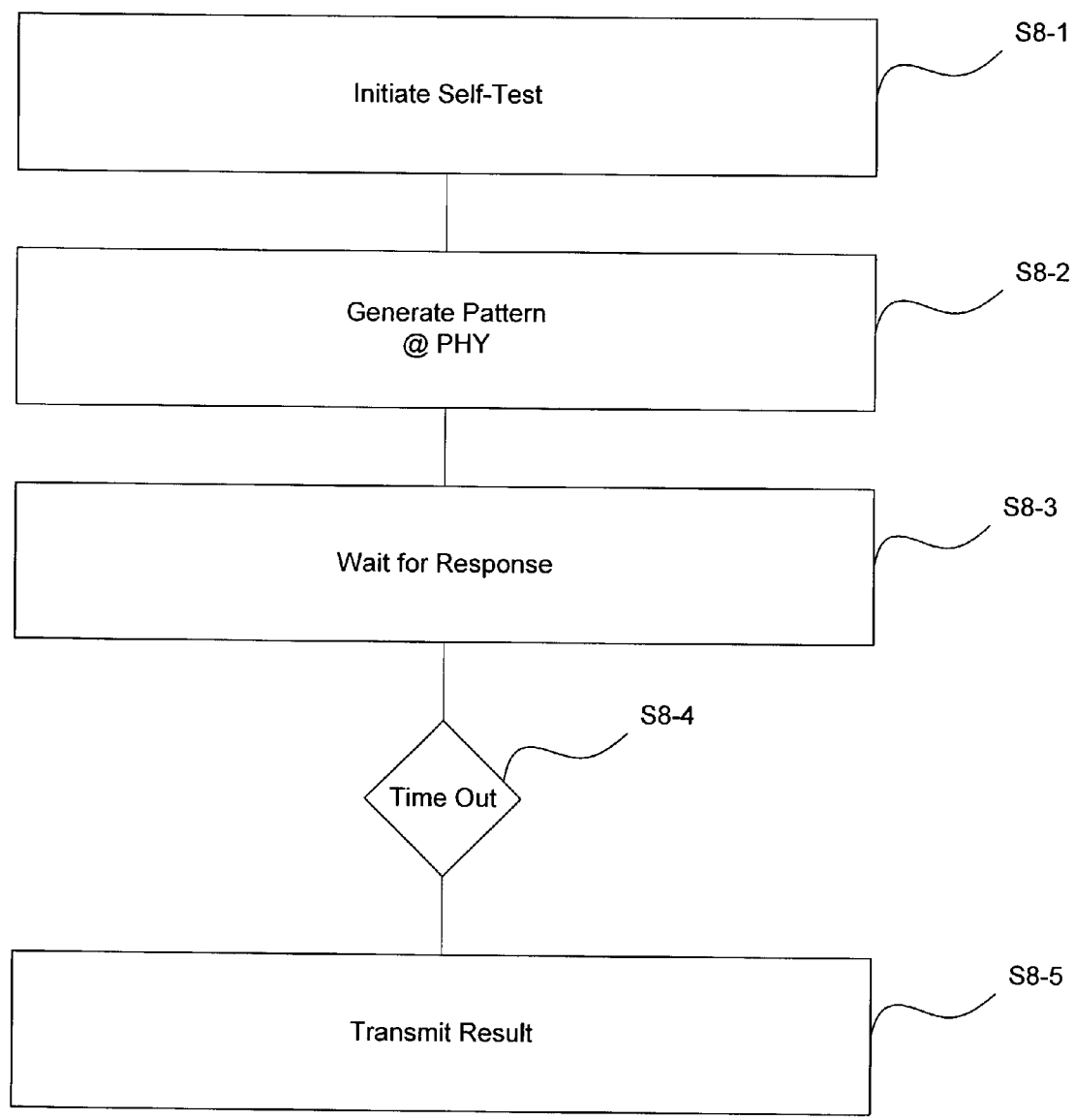
FIG. 8 is a flowchart of a method for performing a physical layer (PHY) loop back self-test according to the invention.

FIG. 8 shows a flow chart of a method for performing a PHY loop back self test, according to an embodiment of the present invention. At step S8-1, the self test may be initiated. As described above, initiation may come from the CPU or from the MAC. For example, a user may initiate a self test within a network device, such as a switch, by communicating with the CPU of the switch in order to request the self test. At step S8-2, the PHY may generate the pattern. As described above, the PHY may include a pattern generation subsystem, which can generate a unique pattern which will not recognized as a frame or an SFD. This pattern may be generated at the PHY and sent onto the medium such as a line or fiber. The PHY may wait a period of time at step S8-3 for a response. After a certain period of time has passed, the test may time out at step S8-4. If a return response is received before the test times out, then the test is determined to be successful. Otherwise, after a time out has occurred, the test may be considered to be unsuccessful. At step S8-5, the result of the test may be reported. As described above, the result may be reported directly to the user or to the switch interface.

Although the invention has been described based upon these preferred embodiments, it would be apparent to those skilled in the art that certain modifications, variations and alternative constructions would be apparent, while remaining within the spirit and scope of the invention. According to one embodiment of the invention, the invention provides an Ethernet PHY loop back self-test to diagnose failures or malfunctions that may occur within a network transmission line or a device connected to a network. However, in order to determine the metes and bounds of the invention, reference should be made to the appended claims.

We claim:

1. A network device comprising:
a transceiver connected to a communications medium;
a pattern generation unit connected to said transceiver, said pattern generation unit configured to generate a first code word in response to a self-test signal; and
a pattern recognition unit connected to said communications medium and a network entity, said pattern recognition unit receiving said first code word from said transceiver and configured to determine whether said first code word includes a loop back pattern, wherein said pattern recognition unit is configured to generate a second code based upon said first code word and to include in said second code a pattern different from said first code word.

2. The network device as recited in claim 1, wherein said pattern recognition unit generates a return response to said self-test signal.

3. The network device as recited in claim 2, wherein said return response indicates the operating conditions of said network entity.

4. The network device as recited in claim 1, wherein the pattern generation means is configured to generate a disable code word to deactivate said first code word after a predetermined time has expired.

5. The network device as recited in claim 1, wherein said first code word includes a timer to instruct said network device to drop said first code word after a predetermined time has expired.

6. The network device as recited in claim 1, wherein the pattern generation unit is configured to generate a disable code word to deactivate said first code word after a predetermined time has expired.

7. The network device as recited in claim 1, wherein the network device comprises a switch.

8. The network device as recited in claim 1, wherein the network device comprises a router.

9. The network device as recited in claim 1, wherein the network device comprises a hub.

10. A method of performing a diagnostic test in a network, the method comprising:
providing a transceiver;
generating a first code word in response to a self-test signal;
receiving said first code word from said transceiver at a network device;
determining whether said first code word includes a loop back pattern at said network device;
generating a second code based upon said first code word; and
including in said second code a pattern different from said first code word.

11. The method as recited in claim 10, wherein said step of generating a code word generates a return response to said self-test signal.

12. The method as recited in claim 11, wherein the step of generating a code word further comprises the step of:
indicating the operating conditions of said network entity.

13. The method as recited in claim 10, further comprising the step of inserting a timer in said first code word to instruct said network device to drop said first code word after a predetermined time has expired.

14. The method as recited in claim 10, further comprising the step of generating a disable code word to deactivate said first code word after a predetermined time has expired.

15. A network device comprising:
a transceiver means for transmitting and receiving data;
a pattern generation means connected to a connection medium, said pattern generation unit for generating a first code word in response to a self-test signal;
a pattern recognition means connected to said connection medium and a network entity, said pattern recognition means for receiving said first code word from said transceiver means and determining whether said first code word includes a loop back pattern, wherein said pattern recognition means is configured to generate a second code based upon said first code word and include in said second code a pattern different from said first code word.

16. The network device as recited in claim 15, wherein said pattern recognition means generates a return response to said self-test signal.

17. The network device as recited in claim 16, wherein said return response indicates the operating conditions of said network entity.

18. The network device as recited in claim 15, wherein said first code word includes a timer to instruct said network device to drop said first code word after a predetermined time has expired.

* * * * *